C. EVANS, Jr.
MEANS FOR TRANSFERRING LOOSE MATERIAL.
APPLICATION FILED AUG. 4, 1917.
1,268,557.
Patented June 4, 1918.
7 SHEETS—SHEET 1.
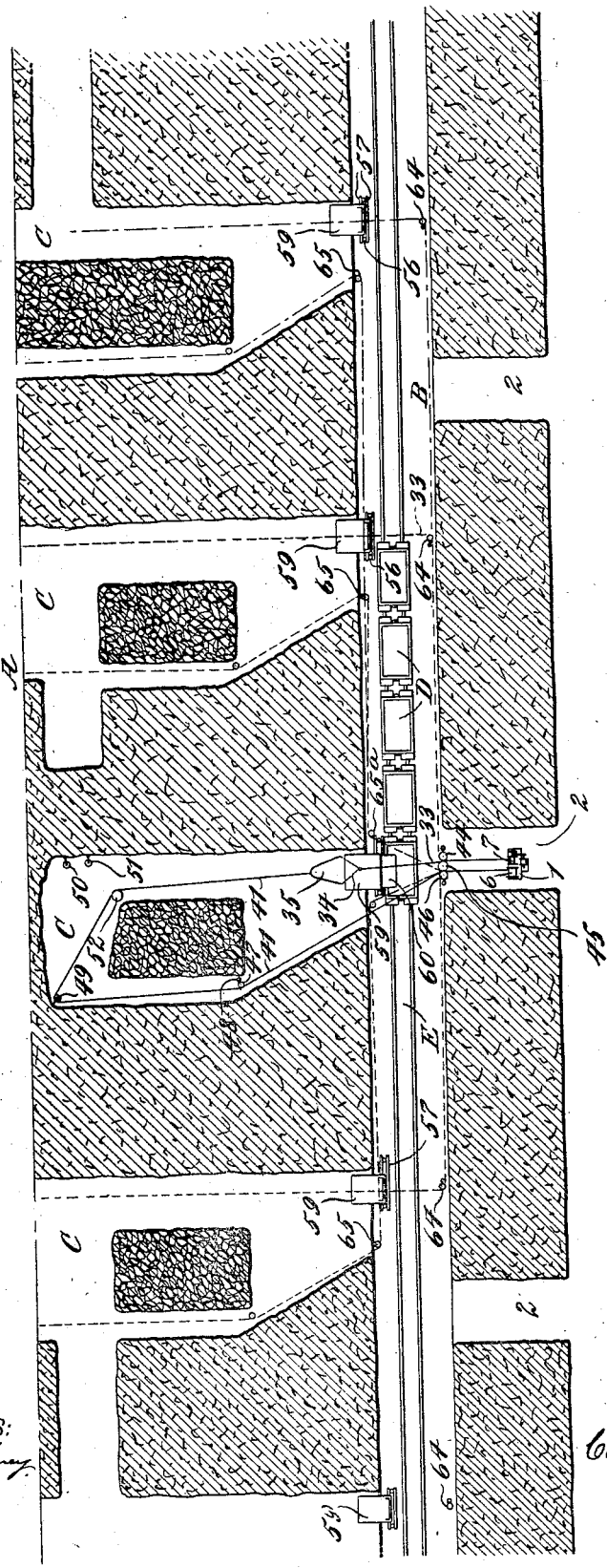
WITNESS:
INVENTOR
Cadwallader Evans Jr.
BY Gifford Bull
his ATTORNEYS

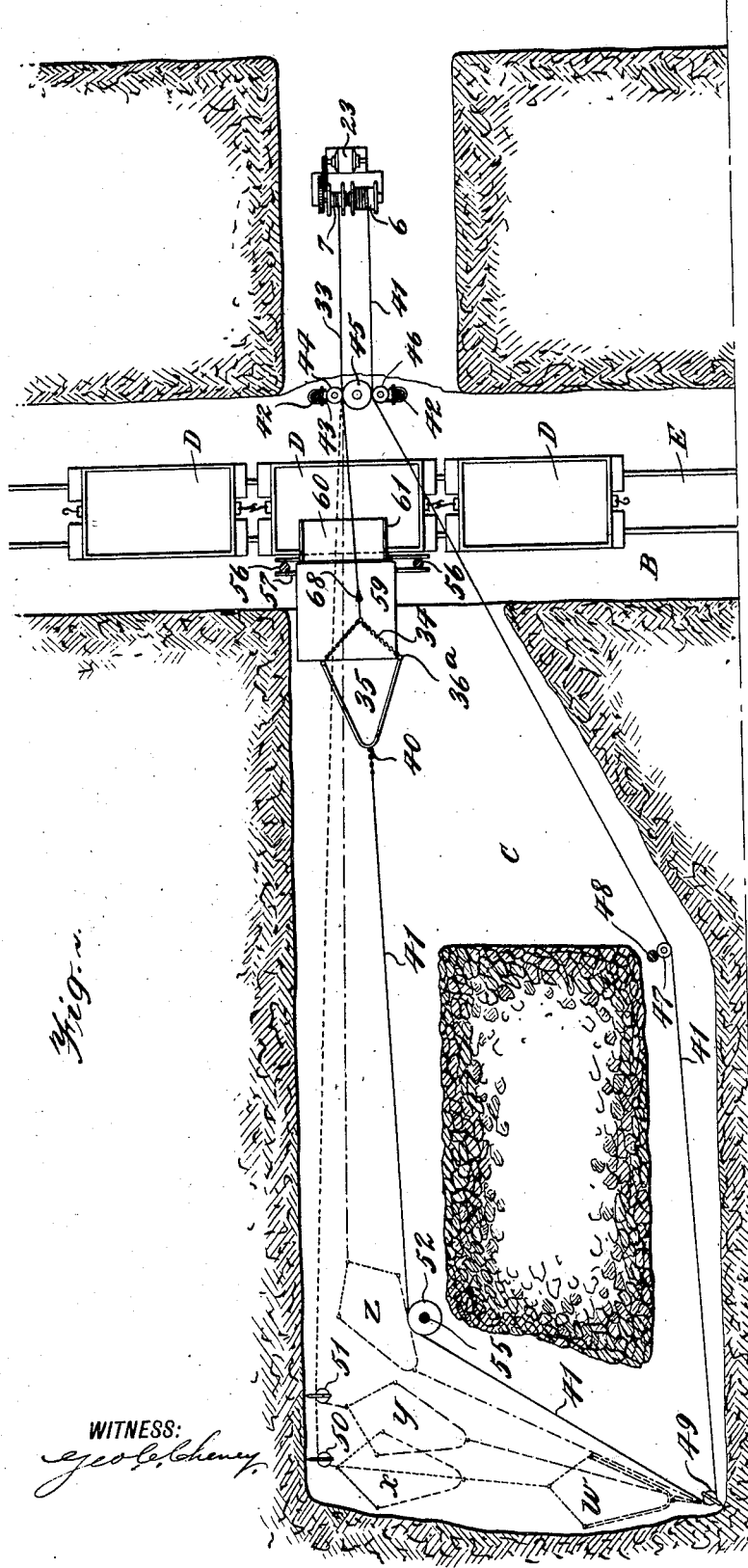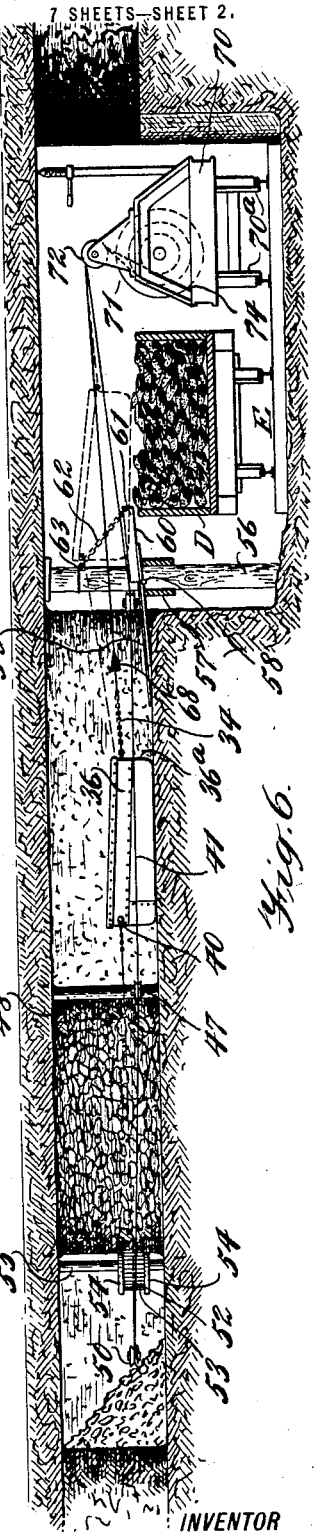

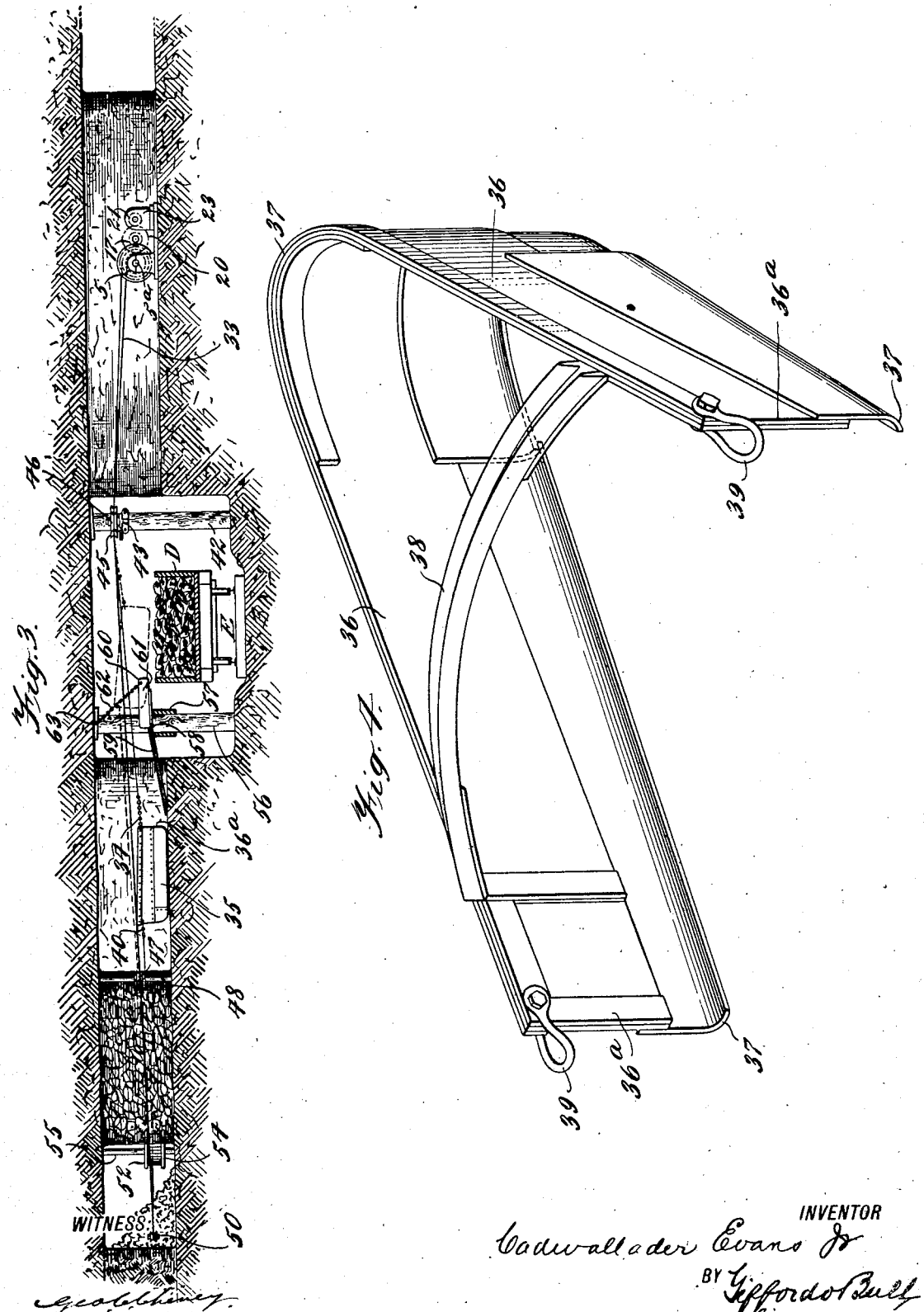

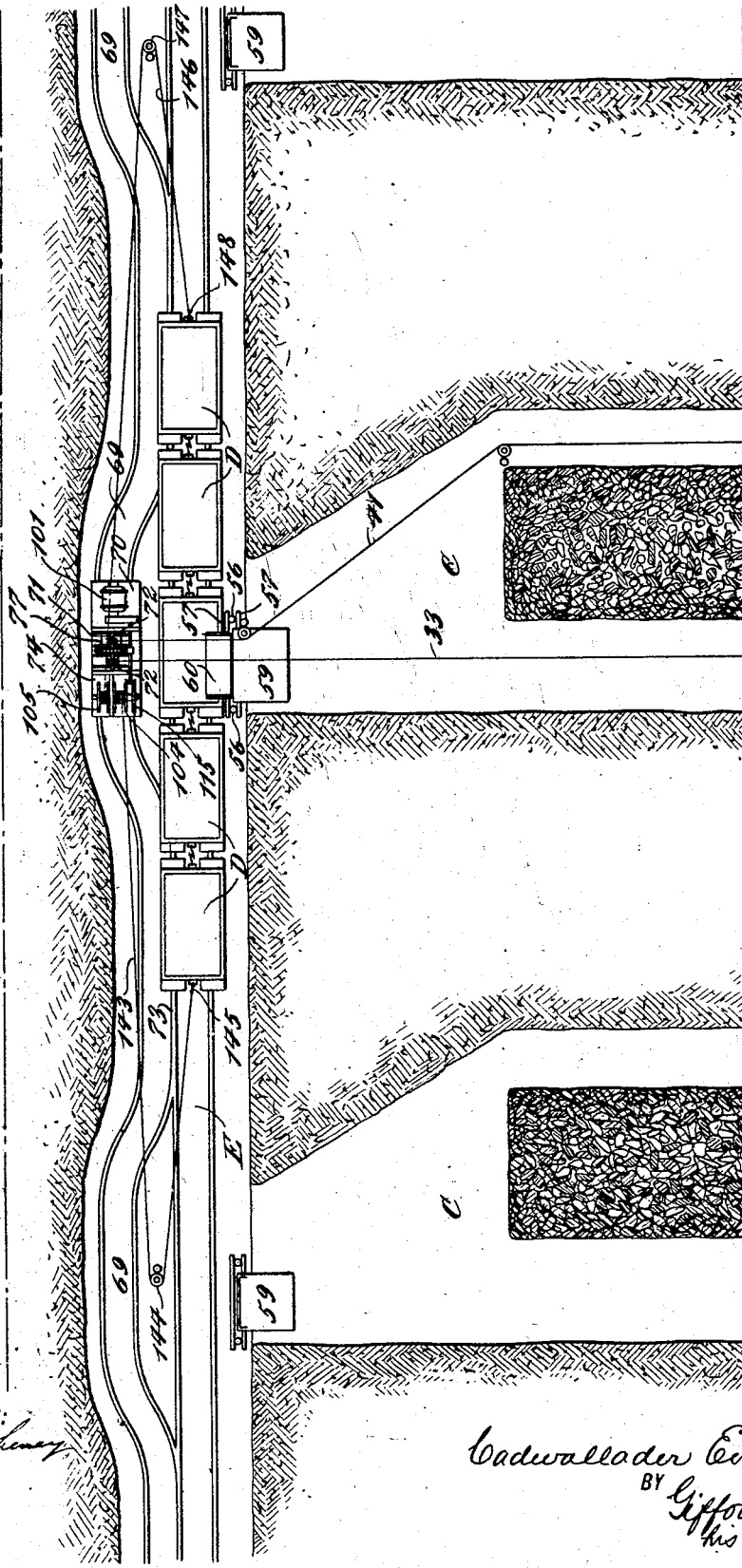

C. EVANS, Jr.
MEANS FOR TRANSFERRING LOOSE MATERIAL.
APPLICATION FILED AUG. 4, 1917.
1,268,557.
Patented June 4, 1918.
7 SHEETS—SHEET 5.
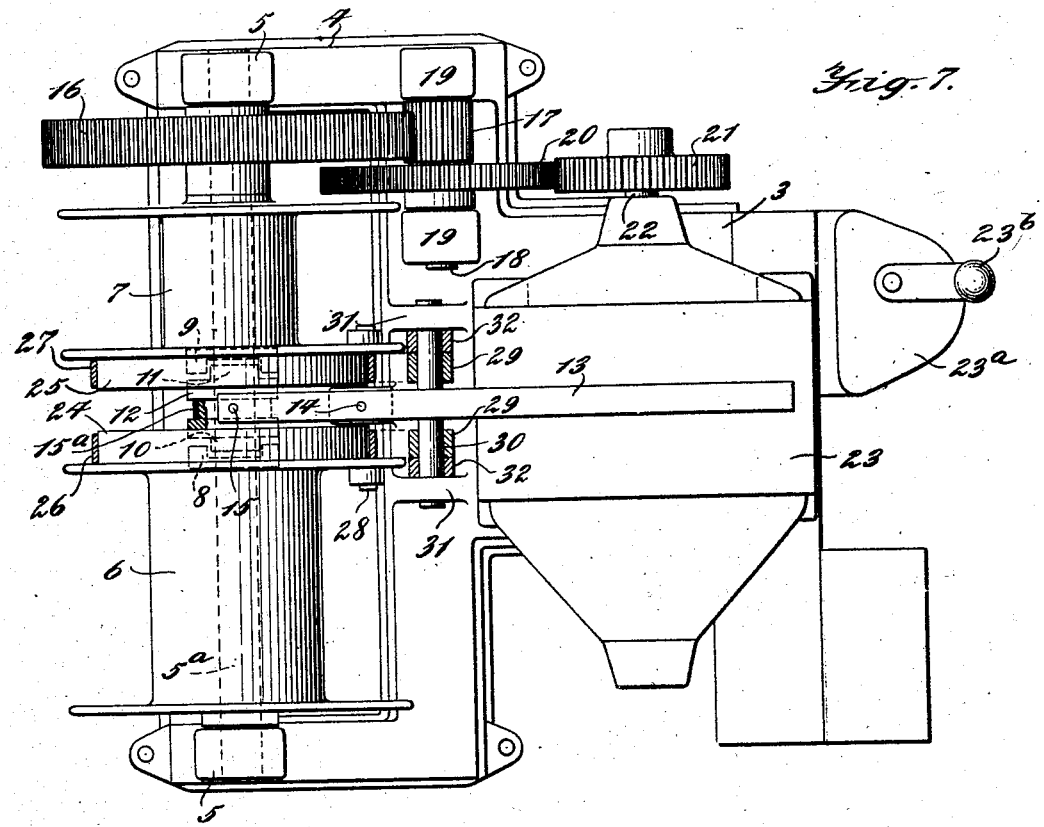
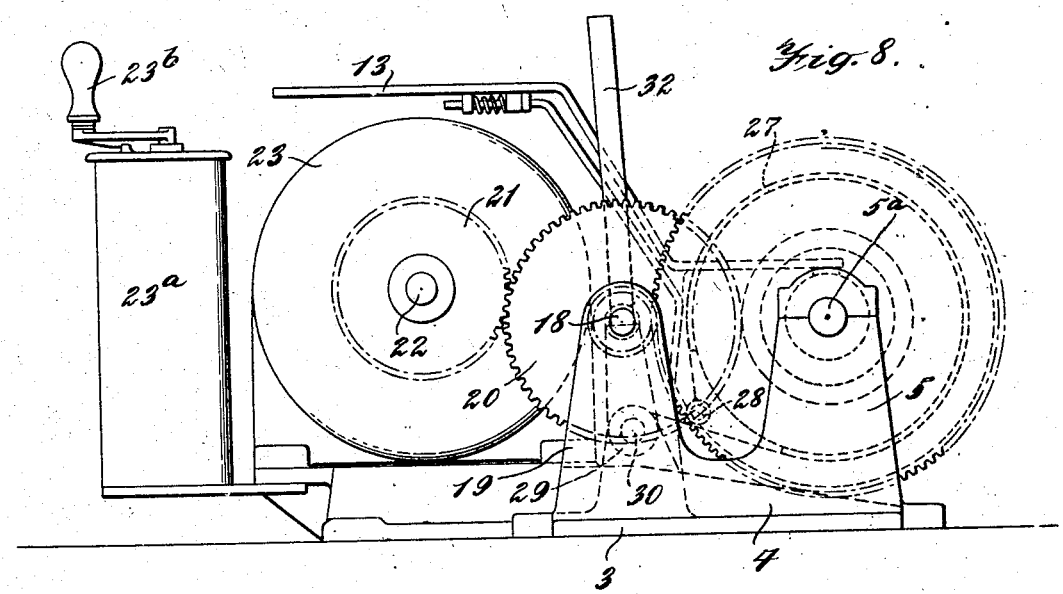
WITNESS:
INVENTOR
Cadwallader Evans Jr
BY Gifford & Bull
his ATTORNEYS

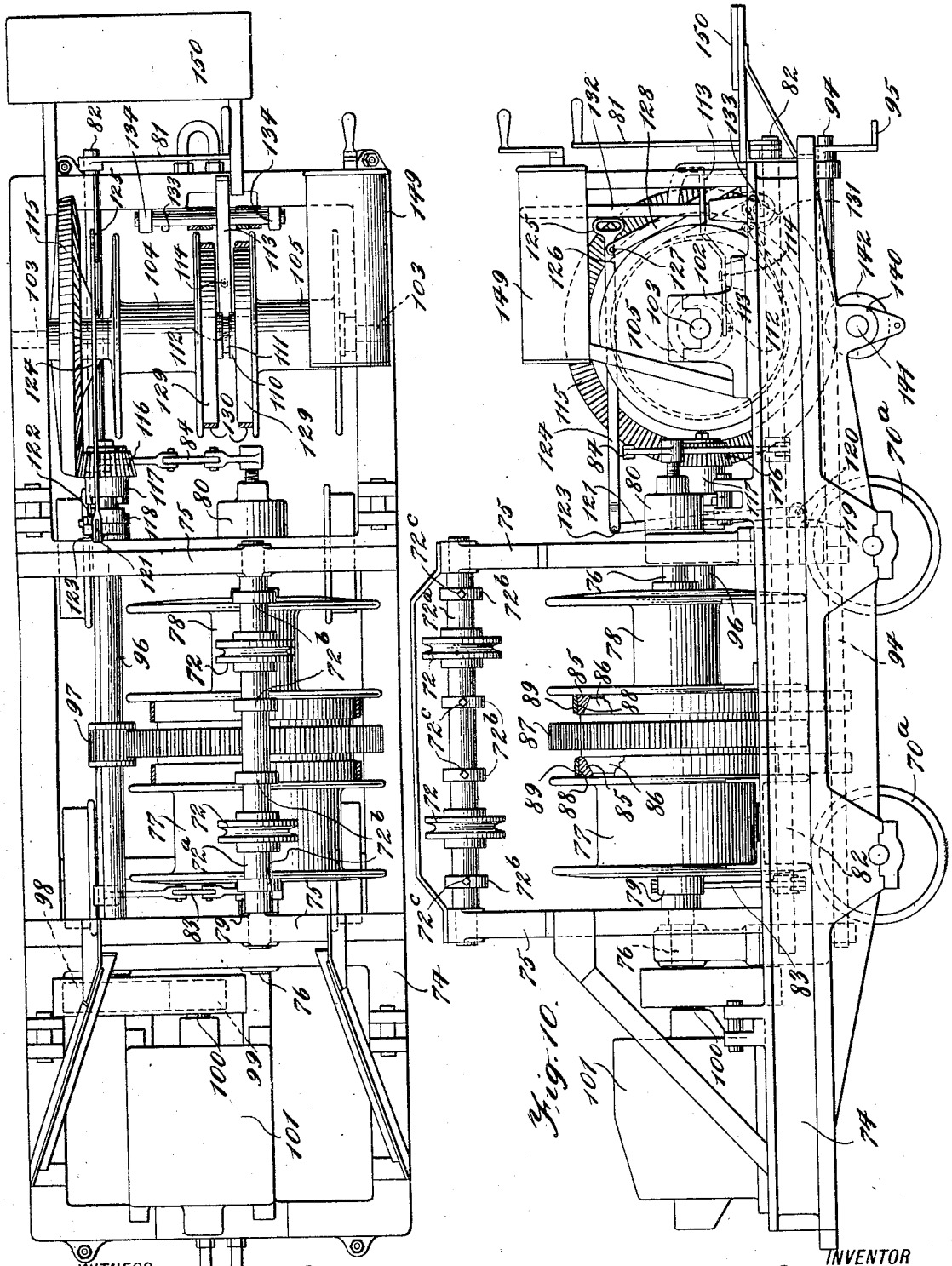

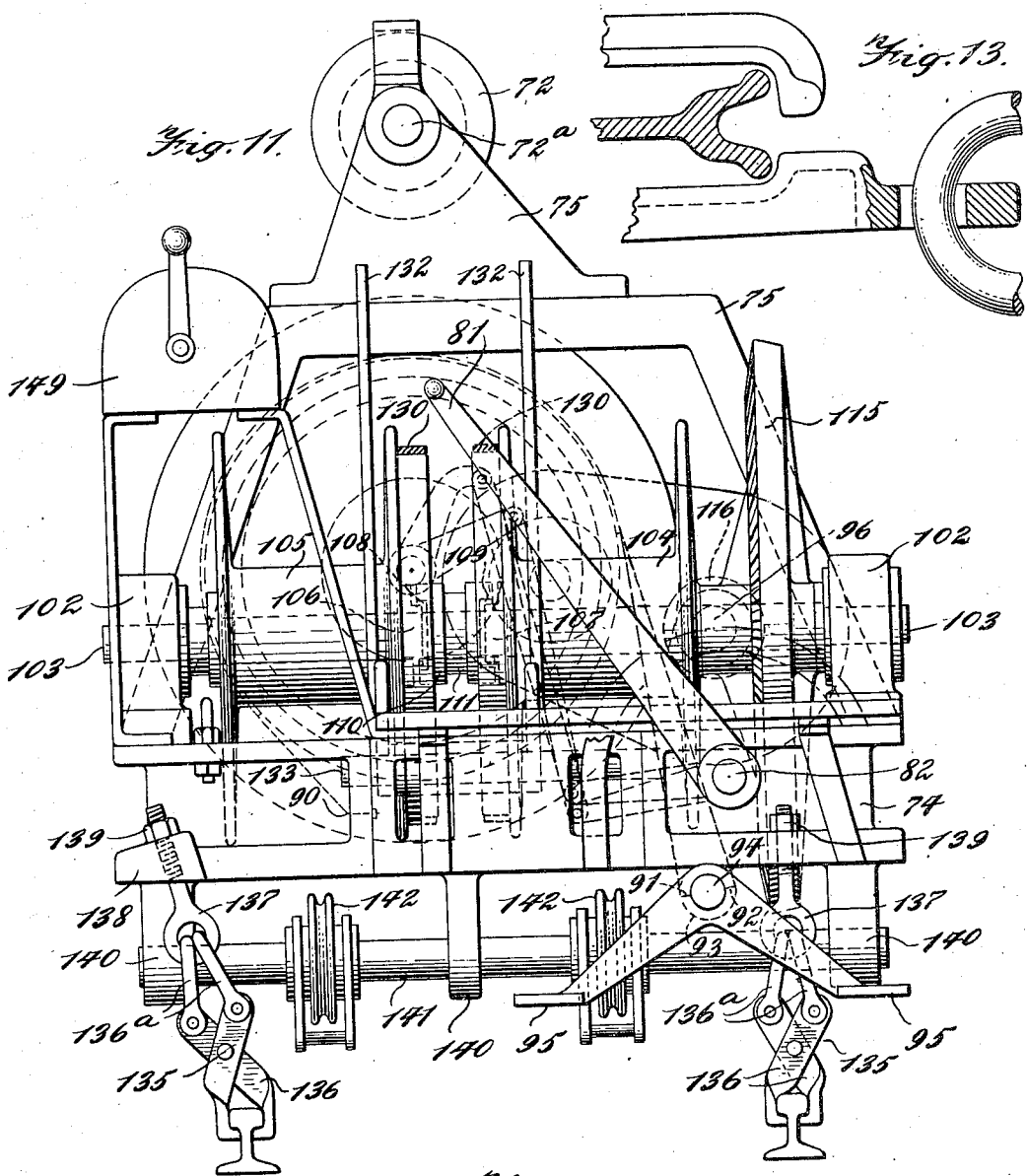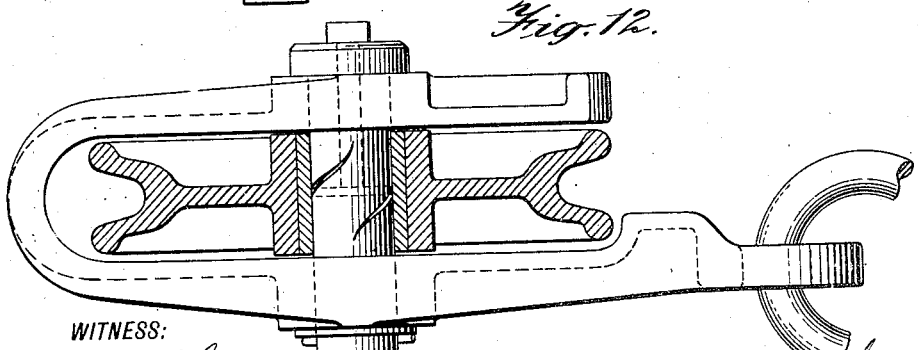

BEST AVAILABLE COP*

UNITED STATES PATENT OFFICE.

CADWALLADER EVANS, JR., OF SCRANTON, PENNSYLVANIA.

MEANS FOR TRANSFERRING LOOSE MATERIAL.

1,268,557.  Specification of Letters Patent.  Patented June 4, 1918.

Application filed August 4, 1917. Serial No. 184,383.

*To all whom it may concern:*

Be it known that I, CADWALLADER EVANS, Jr., a citizen of the United States, residing at Scranton, in the county of Lackawanna and State of Pennsylvania, have invented certain new and useful Improvements in Means for Transferring Loose Material, of which the following is a specification.

My invention relates broadly and generally to new and useful improvements in means for transferring loose material, and while capable of use in many situations and for many purposes wherein it is desired to transfer loose material from one point to another, it is particularly adapted for use in mining operations for transferring coal or other material which has been shot down or otherwise mined, from one point to another. The invention will be found of great utility in transferring mined coal or other material in mining operations wherein the bed being mined lies in thin or shallow beds or veins, when these beds or veins lie in a substantially horizontal plane or a plane so nearly horizontal so that the loose material will not move by gravity, under which conditions the chamber formed, as the result of the mining operations and the removal of the material, is shallow—that is, of a height substantially that of the bed or vein of coal or other material. By means employed prior to my invention, the removal of the loose material from these shallow and nearly horizontal chambers has been very difficult, tedious and expensive, due to the fact that such prior means necessitated substantially all of the material being handled with hand shovels operated by laborers, which could not be conveniently done, because of the chamber being necessarily of such limited height that but little space is afforded the miners for movement in shoveling the coal or other material, the miners being forced to work in such cramped position, and the work being so laborious that it is with difficulty that men can be obtained to shovel the coal or other material under such conditions. By my invention practically all manual shoveling is obviated and the loose coal or other material is transferred from the working face of the chamber, or other point, and delivered where desired, rapidly and efficiently, and with the least possible expenditure of manual labor.

The invention consists in the construction, and combination of parts to be more fully described hereinafter and the novelty of which will be particularly pointed out and distinctly claimed.

I have fully and clearly illustrated my invention in the accompanying drawings to be taken as a part of this specification, and wherein—

Figure 1 is a plan view showing one embodiment of my invention;

Fig. 2 is an enlarged plan view of the same embodiment shown in Fig. 1;

Fig. 3 is a vertical sectional view through a mine gallery and chamber and showing the embodiment of Figs. 1 and 2 in side elevation;

Fig. 4 is a perspective view of a scraper constituting one element of my improved apparatus;

Fig. 5 is a plan view of another embodiment of the same invention illustrated in the previous figures;

Fig. 6 is a vertical section through a gallery and chamber of a mine and showing the embodiment of Fig. 5 in side elevation;

Fig. 7 is a plan view of a winding engine adapted for use in connection with the arrangement shown in Fig. 1;

Fig. 8 is a view in side elevation of the winding engine shown in Fig. 7;

Fig. 9 is a plan view of a winding engine adapted for use in connection with the arrangement shown in Figs. 5 and 6;

Fig. 10 is a view in side elevation of the winding engine shown in Fig. 9;

Fig. 11 is a view in end elevation of the winding engine shown in Figs. 9 and 10 and looking toward the left from the right of Fig. 10;

Fig. 12 is a view partly in section of a form of pulley block employed in the rope leads of the system; and Fig. 13 is a detail view of a portion of another form of pulley employed in the rope leads.

Referring to the drawings by characters of reference and particularly to Figs. 1 to 4 inclusive, A designates generally a horizontal section or cut through a mine and showing a main gallery B, from which lead a plurality of chambers C communicating with said gallery, and from which the coal or other material is being mined, it being understood that these chambers are formed by mining the coal or other material beginning on a side face of the gallery or gangway B and working away from the said gallery, as is the practice generally followed in mining veins of coal or other material, which may be of any thickness.

In many cases beds of coal or other material of varying thicknesses are at present mined and the material removed in cars which are taken from the gallery B to the working face of the chamber C and there loaded by hand or by other means. This procedure involves the laying of separate tracks in each of the chambers C and the movement of empty and loaded cars up and down the chamber C to and from the gangway B. In the improved construction here described the labor and expense of laying and maintaining the separate tracks and of moving the cars to be loaded over these tracks is avoided, since by this improved construction the coal or other material is delivered into the mine cars standing upon the gangway B.

By this improved method the labor and expense of shoveling the material by hand into the mine car so placed at the working face is avoided, since the open bottom scraper can be manipulated so as to cause it to load automatically the greater part of the material to be moved. This can be done in thick beds or veins as well as in thin ones and the material so loaded by the scraper can be delivered into mine cars without the use of physical labor.

In the case of thin beds or veins the material to be removed is frequently shoveled by hand labor at the face of the working chamber C into small cars or buggies and then transported over rails to the gangway B where it is transferred into larger cars. The improved construction here described obviates the labor and expense of the transfer of the material from one vehicle to another, as well as the labor and expense of the original loading by hand.

In other cases, in the mining of thin beds or veins which are too shallow to admit of the mine car being taken through them, provision is made for the admittance of the mine car to the working face of the chamber by removing the adjacent rock either below the bed (as shown in the figures herewith in respect to gangway B) or above the bed for a width and height great enough to permit the mine car to pass. In the improved construction here described the labor and expense of removing this rock along the length of the chamber is avoided, since the scraper can travel in a vertical height much less than that required for a mine car of the usual size, and the labor and expense of shoveling the material into the car is avoided, as before mentioned.

In still other cases, in the mining of thin beds or veins the material to be removed is shoveled by hand into a scraping chain conveyer, which is extended as the chamber lengthens and is arranged to discharge the material into a car standing on the gangway B. In the improved construction here described the labor and expense of this hand shoveling is largely avoided, since the open bottom scraper can be manipulated in such a way as to load automatically the greater portion of the material to be moved.

I will now proceed to describe my invention which is designed to remove the loose mined coal or other material from these shallow chambers with a minimum of hand-shoveling and is capable of delivering the coal efficiently and rapidly to the gallery and the transporting car or cars traveling herein: 1 designates generally a hoisting or rope engine of any suitable type which may be located from preference in a pocket 2 in the mine wall on the opposite side of the gallery B from the chamber C, from which the coal is being mined.

This engine, in the illustrative embodiment, includes a base 3 including side members 4 from which rise pillars 5, in the upper end portions of which is journaled a drum shaft 5$^a$, upon which shaft are loosely mounted two flanged drums 6 and 7, the former preferably of larger diameter than the latter for purposes to be presently set forth. The inner or adjacent ends of the drums are provided with clutch jaws or projections 8, 9, adapted to be engaged by suitable coöperating clutch members 10, 11, to connect the drums to said shaft whereby said drums may be driven from the shaft. The clutch members 10, 11, are connected to and carried by a sleeve 12 mounted on the shaft between the said drums and their clutch jaws 8, 9, and keyed to the shaft for movement lengthwise of the shaft, so that when the sleeve is shifted to engage one or the other of the clutch members thereon with the clutch jaws on the drums, one drum will be connected to the shaft to be driven thereby, and the other will be disconnected from the shaft, so that it may run free thereon. The sleeve 12 may be shifted longitudinally of the shaft by means of a hand lever 13 fulcrumed intermediate its ends as at 14 on the frame, and connected at one end as at 15 to a collar 15$^a$ loose on said sleeve in any suitable manner. It will be seen that by rocking said lever on its shaft the said sleeve may be moved in either direction longitudinally of the drum shaft. Keyed to the drum shaft is a driving gear 16 driven from a pinion 17 on a countershaft 18 journaled in pillars 19 on the bed frame, said countershaft carrying a gear 20 relatively larger than the pinion 17, which gear 20 meshes with a driving gear 21 on the armature shaft 22 of an electric motor 23. The drums 6 and 7 are provided with annular friction brake flanges 24, 25, with which coöperate band brakes 26, 27, one end of each of said band brakes being anchored as at 28 on the frame, and the other ends fastened to collars 29 rotatably mounted on a shaft 30 held in brackets 31 on the frame, and to each of which collars is rigidly connected a hand lever 32, by means of which the brakes may be independently operated to retard rotation of the drums or hold them against rotation. The arrangement of clutches for connecting the drums should be such that one drum may be connected to the shaft to wind a line thereon, while the other drum may be permitted to run free to pay out the line thereon, as will be hereinafter described. The controller for the motor is shown at 23ª, having the hand operated member at 23ᵇ. I do not limit myself to the particular construction of the winding engine to be employed, as this construction may be varied widely without departing from my invention.

Wound upon the drum 7 is a hauling or drag line 33 which is connected by a split bridle 34 to the forward end of a scraper indicated generally at 35. This preferably is substantially V-shaped and consists of vertical side walls 36, 36, joined at the rear of the scraper by a curved rear wall 37, said walls 36 diverging from said rear wall toward the forward end of the scraper. The scraper is open at the bottom portion as clearly shown in Fig. 4, and the side and rear walls are inwardly directed or curved at the lower edges thereof, as at 37′, so that when the scraper is dragged over the floor of the chamber with the open end of the scoop in advance, any loose coal in its path will be caught or gathered between the side walls and dragged over the floor, the inwardly curved portions 37′ serving to cut under the loose coal to assist in gathering the same, and also preventing the scraper from over-riding the lumps of coal, and thereby losing its load. The scraper may be stiffened and braced by a transverse channel iron 38 connected at its ends to the upper portions of the side walls 36 to prevent spreading and also collapse of the latter. The scraper may also be provided with shackles 39 pivoted thereto for connection with the members of the bridle 34 heretofore described. To the outer face of the rear wall 37 of the scraper is connected a shackle 40 to which is connected one end of an outhaul or receding line 41 which is adapted to pass over a guide remote from the point to which the load is to be hauled, and having its other end wound on the drum 6 heretofore described. The arrangement is such that the drag line 33 may be wound on the drum 7 to pull the scraper with its load toward the gallery, while the outhaul line 41 may be operated by being wound on the drum 6 to pull the scraper back into the chamber being mined, in order to take position to be operated to receive a load. In mining it is the practice to work back from the main gallery opening a working face in the coal vein on a plane parallel or substantially parallel to the main gallery, so that when the coal is thrown down as the result of the mining operation, a pile of loose coal results, located at a distance from the main gallery as the working face recedes from the gallery. I so arrange the means for supporting and guiding the scraper, the drag line and the outhaul line therefor, that the scraper may be moved to take position at one end of the working face (or side of the chamber), and moved across the pile of coal in a direction substantially at a right-angle to the length of the chamber, and then turned and guided to drag the coal toward the main gallery. For the purpose stated I provide adjacent the hoisting engine preferably, a suitable support consisting of vertical posts 42 supporting a transverse horizontal member 43 upon which are rotatably mounted a series of grooved guide pulleys 44, 45, 46, arranged to rotate in a horizontal plane, said pulleys being preferably three in number and arranged adjacent each other with their axes parallel to each other and on the same line, so as to provide a guide space between the middle pulley 45 and each end pulley. The outhaul line 41 passes from its drum 6 between the guide pulleys 45, 46, and is preferably deflected laterally and passed about a guide pulley 47 supported on a post 48 in the chamber being mined, from which pulley 47 it passes rearward into the chamber to a point adjacent the working face from which the coal is being mined, where it is passed over a guide pulley 49 anchored in any suitable manner. The last-named guide pulley 49 is so arranged that when pull is exerted upon the line 41 the scraper will be pulled rearward through the chamber to a point at one end of the working face from which the coal has been thrown down, so that the scraper will be located at one end of the pile of coal. The drag line 33 heretofore described passes from its drum between the pulleys 44, 45, and preferably runs during the operation of the system in a line approximately at right-angles to the main gallery and, when the scraper is withdrawn by the line 41 to position to take a load, as shown in dotted lines in Fig. 2, is adapted to be placed over guide sheaves 50, 51, suitably anchored in the chamber at the opposite side thereof from which the guide pulley 49 is located, the sheave 50 being located adjacent the end of the chamber and the pile of coal thrown down therefrom, so that when pull is exerted upon the drag line 33 the scraper will be drawn from the position shown at $w$ in dotted lines in Fig.

2, to the position shown at $x$ in Fig. 2, thereby causing the forward edge $36^a$ of one vertical wall 36 of the scraper to cut into or enter the pile of coal and cause the scraper to be loaded. When the scraper has received its load and reached the position $x$, the drag line 33 is detached from the sheave 50 and engaged with the sheave 51 whereupon a pull exerted on the drag line 33 will pull the scraper to the position shown at $y$ in dotted lines in Fig. 2, wherein the open or forward end of the scraper is partially turned toward the gallery. The drag line 33 is then disengaged from the sheave 51 and the pull again exerted on said line, whereby the scraper is further drawn to the position shown at $z$ in dotted lines in Fig. 2. It will be understood that one or more pulleys such as indicated at 50, 51 may be employed. In order to facilitate the turning movement of the scraper, I provide a buffer guide member 52 consisting of a cylindrical drum 53 having upper and lower end flanges 54, and arranged to rotate on a vertical axis on a shaft 55, said drum being so located that when the scraper drag line is disengaged from the the pulley 51, and further pull is exerted on said line, the scraper will be pulled over to strike the buffer guide member 52 and will fulcrum thereon or ride around the same, so as to have its open end swung around to be dragged toward the main gallery.

It will thus be seen that in taking and transferring the load the scraper moves in two directions at angles to each other; it first moves transversely of or at an angle to the general direction of movement of the drag line between the sheave 50 and the drum 7, during which movement it takes its load, and is then turned and pulled in a substantially straight line toward the platform 59.

In order to facilitate the loading of a coal car with the coal gathered by the scraper, I provide the following means: In the gallery adjacent the point at which the chamber communicates with the gallery I arrange vertical supports 56 upon which is mounted a transverse member 57 to which is secured an apron or platform 59 adapted to extend into and rest upon the floor of the chamber, said apron or platform being preferably of a width greater than that of the open end of the scraper. Pivoted as at 58 on the member 57 is a chute 60 having side flanges 61 and adapted to overlie the car to receive the coal, the free end of the chute 60 being supported by a chain 62 or other suitable means, which may be anchored to the vertical support, as at 63. The arrangement is such that the loaded scraper may be dragged up the apron 59 and over onto the chute 60 until the forward end of the scraper takes position over the car body, whereupon the coal falls through the open bottom of the scraper into the car. It will be noted that during the transporting movement of the scraper, the coal being transported rests upon the bottom or floor of the chamber, is dragged up the apron or platform 59 and across the chute 60. If the floor is rough and interferes with proper dragging of the coal, plates or boards (not shown) may be laid on it so as to furnish a smooth surface over which the scraper may move. During this inhauling operation the outhaul rope 41 is paid out from its drum and follows the scraper, said rope being guided by the buffer pulley 52 after the final turning movement of the scraper, and the further movement of the latter toward the main gallery.

When the scraper has delivered its load to the car, the drum 7 is released from its driving connection so as to run free and the drum 6 is connected to its driving connection so that the outhaul line 41 may be wound thereon. When this outhaul drum 6 is operated to take up its line, the scraper may be pulled back to substantially the position shown at $z$ in Fig. 2, and is then turned by fulcruming on the buffer pulley or guide member 52 and is dragged back to the position shown at $w$ in Fig. 2. In the receding movement under the pull of the outhaul line the scraper does not follow the same path of movement as when being inhauled except between the buffer guide 52 and the platform 59, because the outhaul line does not engage either of the guides 50 or 51 but pulls the scraper directly from the point at which it turns about the buffer guide 52 toward the guide 49, or the point at which it starts to take its load. The drag line 33 is then engaged with the pulley 50 heretofore described and the transporting operation heretofore described may be repeated.

By referring to Fig. 1 of the drawings, it may be seen that any one of the chambers C may be operated from the same winding engine without changing the location of the latter, it only being necessary to provide guide pulleys 64 for the inhaul or drag line opposite the chamber from which the coal is to be collected, and in line with the pulleys 44, 45, 46 heretofore described, and the guide pulleys 65 for the outhaul line adjacent the opening of the chamber. In this arrangement the outhaul line is carried over a guide pulley $65^a$, between its drum and the pulley 65, the said pulley $65^a$ being fixed preferably to the support 57, at the chamber directly opposite the winding engine, or at a suitable point on the gallery opposite the engine provided there is no support 57 at the time available for the purpose.

It will be understood that the arrangement of pulleys just described may be varied widely without departing from the invention.

The pulleys 50, 51 heretofore described are open on one side preferably as shown in detail in Figs. 12 and 13, so that the drag line may be readily engaged and disengaged therefrom by hand. The drag line may be provided with a cone member 68 located in advance of the bridle chain, so that said rope will be automatically thrown out of the pulleys 50, 51 if through accident or inattention of the operatives, the scraper approaches too closely to these pulleys before the drag line is released therefrom.

In Figs. 5 and 6 I have shown another arrangement in which the winding engine is mounted upon a separate car and may be provided with means for propelling the coal cars into and out of position to receive the coal delivered to the scraper. It is not necessary to further describe the rope leads, and scraper, for these may be the same as heretofore described, as is also the delivery apparatus whereby the scraper delivers the coal to the coal cars.

In this embodiment, however, I provide the trackway D in the main gallery with track-sidings 69 upon which is adapted to travel a platform 70 having track wheels 70ª, upon which platform the hoisting engine 71 is mounted. In this arrangement, instead of providing the guide pulleys 44, 45, 46 heretofore described, for the inhaul and outhaul lines, I provide on the frame of the hoisting engine a plurality of guide pulleys 72 over which said lines pass. In order to simplify the arrangement and to do away with switches and cross-overs, the hoisting-engine-car track between the sidings is made up of one rail 73 of the trackway for the coal cars, and the outside additional rail of the sidings, as shown in Fig. 5. It will be seen that if a coal car is out of the way, the hoisting engine car may pass from one siding to another over the outer rail of the siding and the rail 73 of the coal car trackway.

The winding apparatus 71 may be of any suitable type, and in the embodiment illustrated comprises a bed plate 74 extending longitudinally of the car, and from which rise transverse vertical pedestals 75 having journals in which turns a drum shaft 76. Upon the drum shaft 76 are loosely mounted two drums 77, 78 capable of movement longitudinally of the shaft and of rotation thereon, said drums being movable longitudinally of the shaft toward the longitudinal center thereof by means of screw thrusts 79, 80 of any suitable well-known type, which can be readily supplied by those skilled in the art. The screw thrusts are operable by means of a hand lever 81 on one end of a shaft 82, which is connected to the thrusts by lever-and-link connections 83, 84, respectively. The thrusts are right and left threaded respectively so that when one is operated by shaft 82 to move its drum, the force of the other thrust on its drum is relieved.

The drums 77, 78 are provided on their inner or adjacent ends with friction clutch members 85 adapted to coöperate with friction clutch members 86 mounted on the opposite faces of a gear 87 which is fixed to the shaft 76. The arrangement is such that by operating the thrusts 79, 80 respectively, either one of the drums may be moved toward the gear 87 to place the friction clutch on the drum in engagement with the coöperating friction member on the gear, whereby either one of said drums may be driven independently of the other from said gear 87. The drums are each provided with annular braking surfaces 88 with which coöperate band brakes 89 of any suitable type, each band having one end anchored to the frame, as at 90, and the opposite ends connected respectively, as at 91, 92, to opposite sides of a collar 93, on an operating shaft 94, extending lengthwise of the frame. The shaft carries oppositely disposed foot levers 95, by which the shaft 94 may be operated in either direction, whereby one brake may be applied and the other simultaneously released. Journaled in the pedestals 75 and extending longitudinally of the frame and parallel to the drum shaft, is a power shaft 96 carrying a pinion 97 fixed thereto, and meshing with the gear 87 heretofore described. On one end of the power shaft is a gear 98 meshing with a gear 99 on an armature shaft 100 of an electric motor 101. By the arrangement described either one of the drums is driven from the motor through the gear connections set forth. These drums are operable in the same manner as that described in the embodiment shown in Figs. 1 to 4 in order to control respectively a drag line and a receding line to operate the scraper. The pulleys or guide sheaves 72 rotate freely on a shaft 72ª, and have limited play lengthwise of said shaft, the play being limited by stop collars 72ᵇ, adapted to be adjustably fixed to the shaft by set screws 72ᶜ. Mounted upon the car at one end thereof are two pedestals 102 in which is journaled a drum shaft 103 extending transversely of the bed 74 and upon which are loosely mounted two flanged drums 104, 105. These drums are provided at their adjacent ends with jaw clutch projections 106, 107, respectively, adapted to be engaged independently by clutch members 108, 109, respectively, carried by a sleeve 110 mounted on the shaft 103 and keyed thereto to rotate therewith. The clutch sleeve 110 rotates within a collar 111 to which is pivotally connected, as at 112, one end of an operating lever 113, the latter being fulcrumed intermediate its end on the frame, as at 114. By this arrangement either drum 104, 105 may be clutched to the shaft to be driven therefrom. 115 designates a bevel gear fixed in any suitable manner to one end of the shaft 103 and arranged in mesh with the bevel pinion 116 loosely mounted on the end of the power shaft 96, said bevel pinion carrying a jaw clutch member 117 adapted to be engaged by a coöperating jaw clutch member 118, keyed to the power shaft and movable longitudinally thereof to engage and disengage with the said member 117, whereby the pinion 116 may be driven from the power shaft when desired. On the bed frame is a bracket 119, shown in dotted lines in Fig. 10, to one end of which, as at 120, is fulcrumed one end of a lever 121 which is pivotally connected to a yoke or sleeve 122 on the said member 118. The upper end of the lever 121 is pivotally connected, as at 123, to one end of a pull rod 124 having a hand-grasp 125 and intermediate locking notches 126 adapted to engage a locking pin 127 on the upper end of a standard 128 fixed to the frame. By the described arrangement of levers 113, 121 and their connections it will be readily seen that either one of the drums 104, 105 may be driven independently of the other from the power shaft 96.

The inner end of each of the drums 104, 105 is provided with an annular friction flange 129 with which coöperate band brakes 130. Each band brake is connected at one end to the frame, as at 131, and at the other end to a hand-lever 132, fulcrumed on a shaft 133, mounted in brackets 134 extending transversely of the bed-frame. Track shackles of any desired type, shown at 135, may be connected to the car bed for anchoring the car to the track rails while the winding engine is in use to operate the lines of the system. These shackles may each consist of crossed tong members 136 pivoted to each other and connected at their upper or rear ends by links 136ª to a pull bolt 137 passing through an anchorage 138 on the frame and engaged at their upper ends by tightening nuts 139, to take up said bolts whereby the tongs or jaws are operated to clamp the rail, as will be clearly understood from Fig. 11.

Beneath the frame are brackets 140 in which is mounted a shaft 141 upon which are mounted guide pulleys 142 adapted respectively to guide a line to the drums 104, 105.

The drums 104 and 105 are employed for propelling or pulling the coal cars into and out of position in front of the chamber from which the coal is being entered. For this purpose, referring particularly to Fig. 5, the drum 104 is provided with a line 143 which passes from said drum over the adjacent pulley 142 and thence lengthwise of the gallery and around a pulley 144, at which point said line is reversed upon itself and coupled to the car D by a hook 145, or other suitable means. By driving the drum 104 to take up the line 143, the car D, or train of cars, will be pulled lengthwise of the main gallery—that is, to the left toward the pulley 144, as shown in Fig. 5. The drum 105 carries a line 146 similar to the line 143, passing down over a pulley 142 and then over a pulley 147 in the gallery, whence it is reversed upon itself and coupled to the end of the car by a hook 148. It will be seen that by winding up the line 146 on its drum 101, the car, or train of cars will be moved in the opposite direction from that described with reference to the line 143. It will be understood that it is not essential that this car shifting means be employed, but its employment will be found advantageous.

The motor controller is indicated at 149, and a platform 150 is provided for the operator of the winding engine.

In the form shown in Figs. 5 and 6, I have not shown in detail the rope leads and the scraper arrangement at the extreme inner end of the mine chamber, but it will be obvious that they may be the same as that shown in Figs. 1 to 4 inclusive.

In the description given above, the invention has been described for use in transferring loose coal in coal mining operations, and particularly to mining in thin beds or veins where it will be found of great efficiency, but I desire it understood that it is equally applicable to handling any loose material wherever desirable.

What I claim and desire to secure by Letters Patent of the United States is:—

1. In a mining apparatus for transferring loose material to a gallery from a chamber communicating therewith, the combination of a scraper, drag and outhaul lines connected to the forward and rear ends thereof respectively, and means for causing the scraper to move from a given point along the working face of the chamber and then turn toward the gallery, and to return approximately to said point by a different path, comprising a fixed guide detachably engaged by the drag line during the first forward movement and a fixed guide engaged by the outhaul line, said guides being located adjacent the said working face, forwardly of the turning point and rearwardly of the starting point, respectively, and a buffer guide located rearwardly of the turning point, considering the first direction of forward movement and forwardly of the drag line guide, considering the second direction of forward movement, so that the scraper will pass between the drag line and buffer guides on its forward movement, after the drag line has been detached from the drag line guide, and the buffer guide will be engaged by the outhaul line, scraper, and drag line, successively, on the return movement of the scraper.

2. In a mining apparatus for transferring loose material to a gallery from a chamber communicating therewith, the combination of a scraper, a drag line connected to the forward end of the scraper, a drum for operating said drag line, guide means whereby pull on the drag line pulls the scraper forward first in one direction and then in a different direction from a starting point, said means comprising a guide adapted to be engaged by said drag line during the first direction of movement and detached therefrom when the direction of forward movement of the scraper changes, and a buffer guide so positioned that the scraper will be pulled into engagement with the same, and swung partly thereabout, when the guide line is detached from said drag line guide.

3. In a mining apparatus for transferring loose material to a gallery from a chamber communicating therewith, the combination of a scraper, a drag line connected to the forward end of the scraper, a drum for operating said drag line, fixed guide means whereby pull on the drag line pulls the scraper forward in two directions successively, at angles to each other, from a starting point, and means comprising a buffer guide for pulling the scraper rearward to the starting point, in such manner that it will approach the starting point over a path different from that taken by the scraper on its forward movement from the starting point.

4. In a mining apparatus for transferring loose material to a gallery from a chamber communicating therewith, the combination of a scraper, a drag line connected to the forward end of the scraper, a drum for operating said drag line, guide means whereby pull on the drag line pulls the scraper forward first in one direction and then in a different direction from a starting point, said means comprising a guide adapted to be engaged by said drag line during the first direction of movement and detached therefrom when the direction of forward movement of the scraper changes, an outhaul line connected to the rear end of the scraper, guide means and a drum therefor, and a buffer guide, positioned to be engaged and passed around by said outhaul line, scraper and drag line successively, when the scraper is returned to its starting point, to cause the scraper to approach the starting point at a different angle from that in which it leaves its starting point on its forward movement.

5. In a mining apparatus for transferring loose material to a gallery from a chamber communicating therewith, the combination of a scraper, a drag line connected to the forward end of the scraper, a drum for operating said drag line, guide means whereby pull on the drag line pulls the scraper forward first in one direction and then in a different direction from a starting point, said means comprising a plurality of sheaves adapted to be successively engaged by said drag line and disengaged therefrom, as the direction of forward movement of the scraper changes, an outhaul line connected to the rear of the scraper, and guides for the outhaul line, one of the same being adjacent to the starting point, a straight line between said last-named guide and the nearest of said sheaves being at an angle to the line between said sheave and the drag line drum, and the second sheave being positioned substantially in the line between said first sheave and the drag line drum.

In testimony whereof I have hereunto signed my name in the presence of two subscribing witnesses.

CADWALLADER EVANS, Jr.

Witnesses:
T. FORSTER COWTHOPE,
A. H. VAN DERMARK.